United States Patent
Herberholz et al.

(10) Patent No.: US 11,409,323 B2
(45) Date of Patent: Aug. 9, 2022

(54) DELAY MONITORING SCHEME FOR CRITICAL PATH TIMING MARGIN

(71) Applicant: Arm Limited, Cambridge (GB)

(72) Inventors: Rainer Herberholz, Great Abington (GB); Peter Andrew Rees Williams, Great Abington (GB)

(73) Assignee: ARM LIMITED, Cambridge (GB)

( * ) Notice: Subject to any disclaimer, the term of this patent is extended or adjusted under 35 U.S.C. 154(b) by 270 days.

(21) Appl. No.: 16/723,273

(22) Filed: Dec. 20, 2019

(65) Prior Publication Data
US 2021/0191452 A1 Jun. 24, 2021

(51) Int. Cl.
*G06F 1/10* (2006.01)
*H03K 19/21* (2006.01)
*G06F 21/71* (2013.01)
*H03K 5/00* (2006.01)

(52) U.S. Cl.
CPC .............. *G06F 1/10* (2013.01); *G06F 21/71* (2013.01); *H03K 19/21* (2013.01); *H03K 5/00* (2013.01); *H03K 2005/00078* (2013.01)

(58) Field of Classification Search
CPC ........ G01F 1/10; G06F 21/71; G06F 2119/12; G06F 30/3312; G06F 21/70
See application file for complete search history.

(56) References Cited

U.S. PATENT DOCUMENTS 6,144,242 A * 11/2000 Jeong ............... H04L 25/085
                                                    327/269
2021/0081528 A1* 3/2021 Hershman ............ G06F 1/08

OTHER PUBLICATIONS

Martin Wirnshofer et al., "A Variation-Aware Adaptive Voltage Scaling Technique based on In-Situ Delay Monitoring", Proceedings of the 14th IEEE International Symposium on Design and Diagnostics of Electronic Circuits & Systems, Apr. 13, 2011, 6 Pages.
Martin Wirnshofer, et al., "Adaptive Voltage Scaling by In-Situ Delay Monitoring for an Image Processing Circuit", Proceedings of the 15th IEEE International Symposium on Design and Diagnostics of Electronic Circuits & Systems, Apr. 18, 2012, 4 Pages.

(Continued)

*Primary Examiner* — Daniel C Puentes
(74) *Attorney, Agent, or Firm* — Talem IP Law, LLP

(57) ABSTRACT

A monitoring system for monitoring delay of critical path timing margins can include a plurality of adaptive monitoring circuits, where each adaptive monitoring circuit is coupled to a corresponding one of a plurality of paths in a circuit. Each adaptive monitoring circuit can include a first delay element designed to cause a mean timing margin of the plurality of N paths in the circuit to be within one minimum mean unit delay; a second delay element coupled to the first delay element and designed to add a mean delay of $k*\sigma_{max}$; a set-up capture element capturing an output of the second delay element; and a set-up warning comparison element that outputs a set-up warning signal when the output of the set-up capture element and a shadow capture element or a capture element of the corresponding one of the plurality of paths do not satisfy an expected condition.

14 Claims, 15 Drawing Sheets

(56) References Cited

OTHER PUBLICATIONS

Shan, Weiwei, et al., In-Situ Timing Monitor-Based Adaptive Voltage Scaling System for Wide-Voltage-Range Applications, IEEE Access, Jan. 1, 2017, 8 Pages, vol. 5.
Martin Wirnshofer, "Evaluation of the Pre-Error AVS Approach" In: Variation-Aware Adaptive Voltage Scaling for Digital CMOS Circuits, Jan. 1, 2013, 11 pages, Springer Series in Advanced Microelectronics vol. 41, Chapter 7, Springer.
International Search Report and Written Opinion issued in International Application No. PCT/GB2020/052926, dated Feb. 16, 2021, 20 Pages.

* cited by examiner

DELAY MONITORING SCHEME FOR CRITICAL PATH TIMING MARGIN

BACKGROUND

Computing systems can be susceptible to attacks by adversaries. Adversaries may try to perform attacks, such as side channel attacks and physical fault injection, to gain information about the operations of the system. Side channel attacks are indirect ways of observing details of the operations that are taking place within the system, such as electromagnetic signals that are generated by switching. Skewing the operating conditions may enhance the leakage of information through side channels. Or, in the case of physical fault injection, attackers may attempt to willfully induce a certain behavior in the system by manipulating the voltage, temperature, or a signal. Any of these types of manipulations may cause the system to perform in a way that it was not designed for. For example, the switching operations of the system may not perform correctly, causing a disruption in the sequence of data traversing the system.

Systems are designed to operate within boundaries for voltage, temperature, and process variation. A system is designed to guarantee correct operation within the boundaries. The circuit simulations to guarantee that the system operates correctly within the boundaries is called sign-off.

During conventional sign-off, multiple worst-case combinations for voltage, temperature, and process are simulated to guarantee specified timing margins. These worst-case combinations are referred to as "corners." For all conditions bounded by these corners, the sequence of operations of the circuit will always be correct for a given set of inputs at a specified operating frequency. Detection of attacks can either be performed by monitoring the operating conditions of a circuit: voltage, temperature and clock-frequency, or by directly verifying whether the circuit is operating with the timing margins for which the design was simulated.

SUMMARY

Delay monitoring schemes for critical path timing margins are described. A countermeasure against attacks may include monitoring the computing environment for timing violations, which may be caused by changes to the voltage, temperature, clock or other environmental factors such as electromagnetic radiation or light.

Methods to detect timing margins directly are advantageous in order to detect an attack (or malfunction), to provide feedback information to the system to allow reducing the required design margins and enable higher frequency of operation or lower power, or both to detect attack and to provide feedback information.

A system for monitoring the delay of critical path timing margins can be applied to circuits that contain a plurality of critical paths. Each critical path includes a launch point of a data path and a capture element that captures a signal for an endpoint. An adaptive monitoring circuit is coupled to each of the plurality of critical paths (e.g., all of the critical paths or a representative subset of critical paths in the circuit) at each of the flip flops. Each adaptive monitoring circuit includes a delay element, a capture element and a set-up warning comparison element. The output of the set-up warning comparison element can be used to determine whether to adjust operational parameters for the circuit, such as supply voltage, back-gate bias or frequency for the circuit to counteract, or else to stop operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Delay monitoring schemes for critical path timing margins are described.

A data path is a path in which logic operations occur. A data path may be represented as a plurality of logic gates and an electrical interconnect used to transmit data, such as a metal wire. The delay of a data path as a whole is generally designed to be between two values, for example, x and y. The timing margin of a data path can be measured at the flop capturing the output of the computation. A circuit may comprise many such paths that connect components on a chip. A circuit will operate as designed when the output of the computation is set-up at the flop input before the clock edge and is held long enough for the capture to take place based on the clock signal. The timing of signals along a path can be dependent on different factors, such as length of the interconnections, the type and number of transistors switching, the local and global variation of the component properties along the path, as well as supply voltage and temperature. Some paths will transmit signals faster than others. For set-up timing, the paths with the longest delays, including the statistical variations of the delay between identically designed paths, are referred to as critical paths.

Changes to the voltage and temperature of a circuit can cause the timing margins to vary. The timing margin can be tracked by adapting an operational quantity in the circuit, such as supply voltage and frequency, and can be tracked across variations of process and temperature.

Figure 4B:
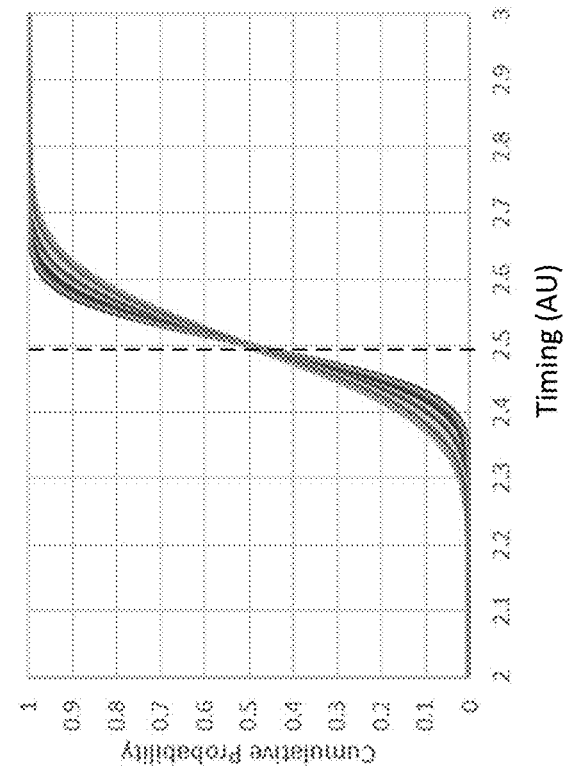
FIG. 4B shows a graph of example simulated timing distributions of the paths of FIG. 4A that have been adjusted to match their mean timing after insertion of a first delay element and second delay element of an adaptive monitoring circuit.
Figure 4A:
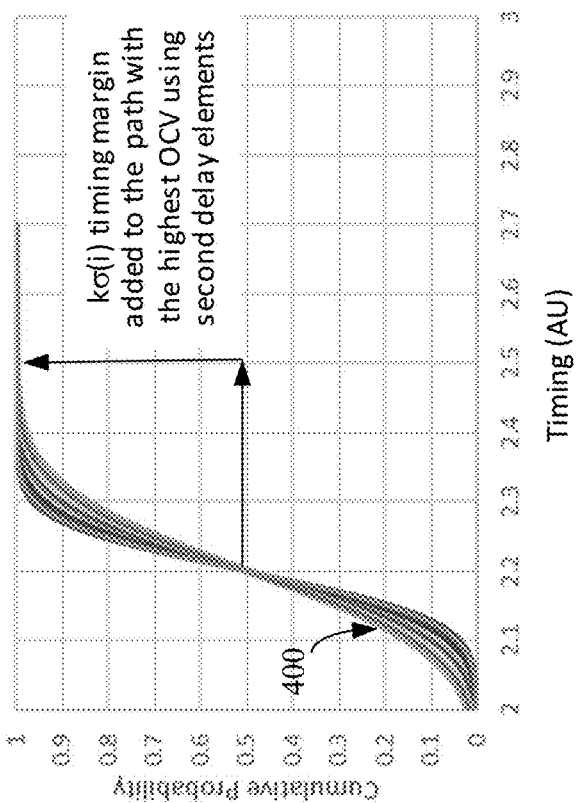
FIG. 4A shows a graph of example simulated timing distributions of critical path delays for identically designed paths affected by random local variations following insertion of a first delay element.

As part of the described delay monitoring schemes, an adaptive circuit operation is presented (see e.g., description of how the adaptive circuit operation is designed with respect to FIGS. 4A and 4B) that measures the timing margin of a circuit during runtime operation and identifies adaptations that can be applied to compensate. To infer the integrity of a circuit design (e.g., the ability to correctly complete the operations), the timing margins can be measured directly and used as the primary input for any adaptation. This is in contrast to conventional sign-off for fixed operating conditions, that infers the integrity of the circuit by considering extremes of voltage or temperature. In order to maintain the integrity of the circuit design, the timing margins can be tracked and quantified in relative units, expressed as the number of delay elements worth of timing margin that should be reserved. In various implementations, the delay element is an inverter or buffer. The described adaptive operation measures the timing margin during operation of a circuit and produces an output that the system can use to regulate either the clock frequency that the circuit operates with or operational conditions to maintain a required clock frequency, such as the supply or back-gate voltage. Adaptive operation can be applied to any digital design, including cryptography circuits performing security functions.

In some cases, adaptive operation can focus on maintaining timing margins for the worst-case set-up case. Set-up is the condition in which data arriving into a capture element (e.g., a flop) is guaranteed to have been through its computational chain before a clock impulse arrives that captures the data. To maintain timing margins for the worst-case set-up case, including all operating conditions, an output is provided that, for example, adapts regulator characteristics, or clock generation.

It should be understood that although specific reference in the figures may be to a delay element in the form of an inverter or a buffer, the opposite type of delay element (i.e., inverting or non-inverting) may be used depending on desired design constraints. For example, in some cases an inverting delay is desirable (e.g., inverting delay may prevent increased data leakage due to additional rising transitions); whereas in other cases, a non-inverting delay is desirable.

Figure 1A:
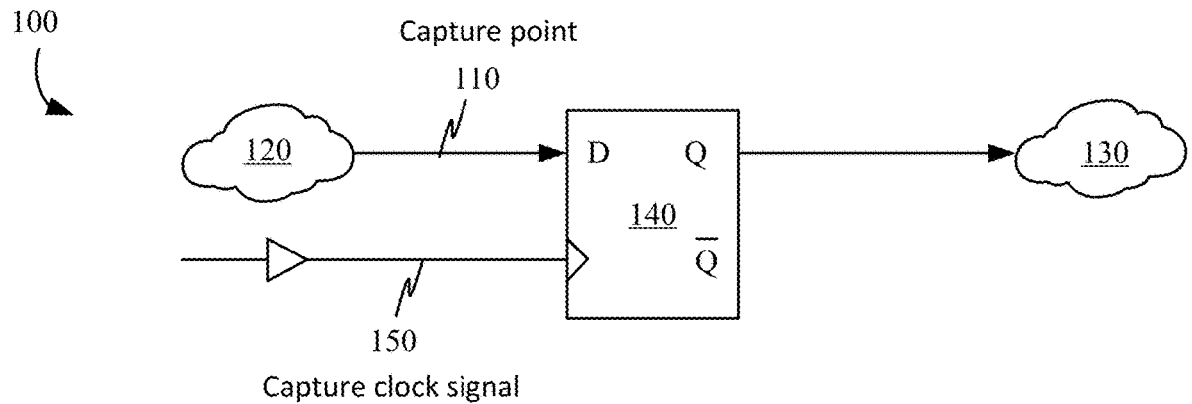
FIG. 1A shows an example of a circuit with a launch point of a data path and a capture element that captures a signal for an endpoint.

FIG. 1A shows an example implementation of a circuit with a launch point of a data path and a capture flip flop that captures a signal for an endpoint. For simplicity, the circuitry 100 of the chip shows a capture point 110 from a first stage of a single digital data path 120 (represented by a logic cloud) to a second stage 130 of computation (also shown as a logic cloud). The digital data path 120 may be a critical path. A "stage" is a set of effectively parallel computations that are performed during a particular clock cycle. In the illustrated examples herein, a logic cloud is used to represent logic of a path and suggests that there can be multiple inputs into the logic gates on the path. A capture element 140 captures the data (e.g., for capture point 110) at a rising edge of a capture clock signal 150 and latches the data internally for an endpoint (e.g., for the second stage 130 of computation). The capture element 140 may be, for example, a flip flop or other capture device. The data appears at the output of the capture element 140 and is fed into the second stage 130 of computation, which may perform further logic operations on the data.

In the context of protecting the operation of the system including circuitry 100, adversaries may attempt to corrupt the data capture into the capture element 140 or gain information about the captured data 110. To counteract a potential attack, elements can be added to quantify the margin (timing) between the data computation ready at the output of the first stage 120 (e.g., capture point 110) and the clock signal 150 arriving that captures the data in capture element 140.

There are two types of timing violations that can be monitored to guarantee that the digital circuit functions as intended: set-up and hold. As previously mentioned, set-up is the condition in which data arriving into a capture element (e.g., a flop) is guaranteed to have been through its computational chain before a clock impulse arrives that captures the data. A set-up error is a timing violation in which the first stage 120 has not completed computations/operations before the capture clock signal 150 causes the capture element 140 to capture the value at capture point 110. Hold is a timing violation whereby the capture clock signal 150 arrives at the capture element 140 late, to cause the capture element 140 to possibly fail to capture the appropriate data output from the first stage 120. In such a case, the first stage 120 may already have performed a subsequent operation and output a new value, such that by the time the capture clock signal 150 arrives, the data that should have been captured by the capture clock signal 150 and used in the second stage 130 is no longer present at the data input to the capture element 140.

Figure 1B:
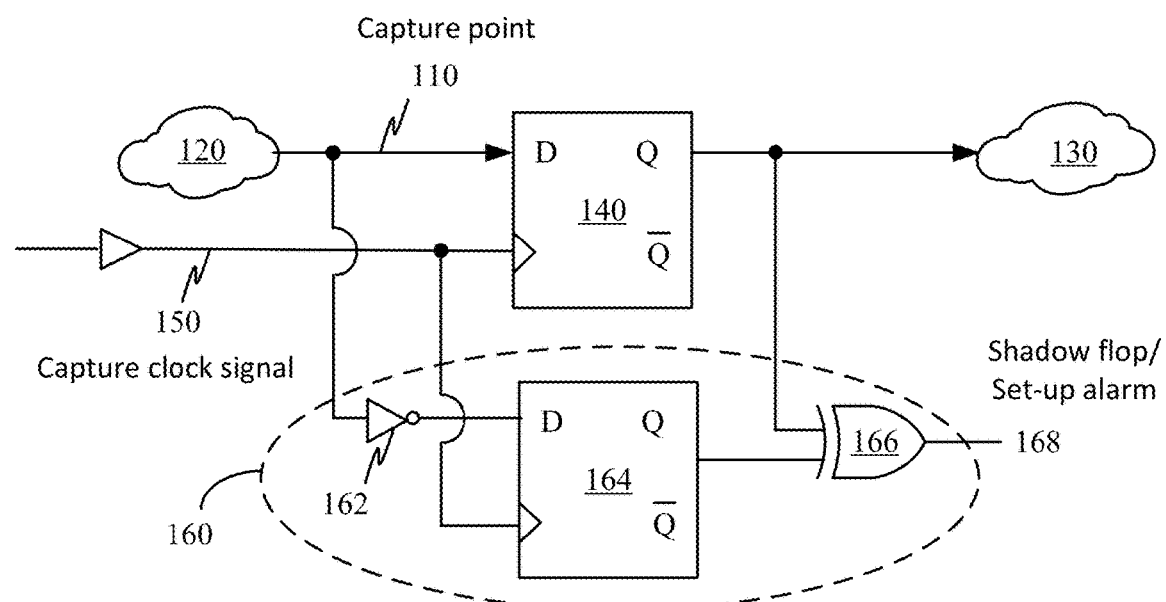
FIG. 1B shows an example implementation of a set-up alarm circuit.

FIG. 1B shows an example implementation of a set-up alarm circuit. Here, the circuit includes the digital data path 120, capture element 140, and second stage 130 described with respect to FIG. 1A and further includes sensing circuit 160, which may be similarly applied to every digital data path on the chip or select data paths on the chip. In the example shown in FIG. 1B, the sensing circuit 160 includes a delay element 162, a shadow capture element 164, and a comparison element 166. The delay element 162 can be a delay inverter or a buffer, as examples. In the illustrated implementation, the delay element 162 is an inverter. The shadow capture element 164 may be, for example, a flip flop or other capture device. The comparison element 166 may be, for example, an XOR logic gate, a comparator, or other comparison device.

Data from the output of the first stage 120 of computation that is captured at the capture element 140 at capture point 110 is also fed through delay element 162 and then captured by shadow capture element 164 under control of the capture clock signal 150. The comparison element 166 compares the output of capture element 140 with the output of shadow capture element 164. The output of the comparison element 166 gives an indication if the two capture elements (capture element 140 and shadow capture element 164) have captured the same data. If the two capture elements (capture element 140 and shadow capture element 164) have not captured the same data, then one of the two capture elements has been disturbed and a shadow flop/set-up alarm signal 168 can be output to indicate the error. Accordingly, the comparison element 166 is coupled to compare the output of the capture element 140 and the output of the shadow capture element 164, and is configured to output a set-up alarm signal when the output of the capture element 140 and the output of the shadow capture element 164 do not satisfy an expected condition. The expected condition can be that the values received at the input of the comparison element 166 are the same, within a tolerance (e.g., within an expected variance of a value indicating a logical 1 or a logical 0).

The basic sensing circuit 160 of FIG. 1B can be expanded upon to monitor for set-up timing violations, supporting the described delay monitoring scheme.

Figure 1C:
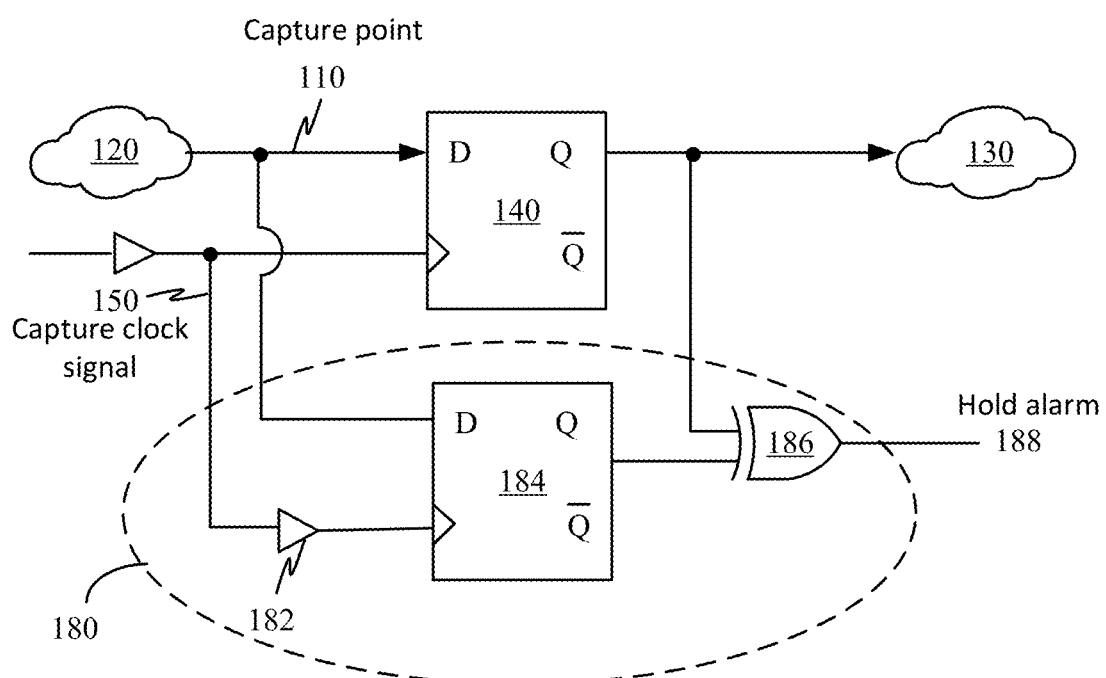
FIG. 1C shows an example implementation of a hold alarm circuit.

FIG. 1C shows an example implementation of a hold alarm circuit. The hold alarm circuit 180 may be implemented instead of or in addition to the sensing circuit 160 described with respect to FIG. 1B. To check for a hold violation, a hold alarm circuit 180 can be implemented. The hold alarm circuit 180 can include a delay element, such as buffer 182, a hold capture element 184, and a hold comparison element 186. The delay element 182 can add a delay to the capture clock signal 150 fed to the hold capture element 184. The hold capture element 184 can be a flip flop or other capture device. The hold comparison element 186 may be, for example, an XOR logic gate or a comparator. The hold comparison element 186 checks to see if the real data that propagates from digital data path 120 is the same as the data captured using the delayed clock on hold capture element 184.

A hold alarm signal 188 is produced when the hold comparison element 186 indicates that the two values captured from the output of the first stage 120 do not satisfy an expected condition. In particular, the hold comparison element 186 is coupled to compare the output of the capture element 140 and the output of the hold capture element 184, and is configured to output a hold alarm signal when the output of the capture element 140 and the output of the hold capture element 184 do not satisfy the expected condition. The expected condition can be that the values received at the input of the hold comparison element 186 are the same, within a tolerance (e.g., within an expected variance of a value indicating a logical 1 or a logical 0). In some cases, the amount of delay designed into delay element 182 is determined through simulation and is fixed in the design stage. In some cases, the amount of delay can be determined through characterization. During simulation and design of the delay element 182, testing for hold violations is conducted over all implementation conditions as the adaptive operation may deal with set-up only.

While the hold alarm may have a fixed delay, set-up timing may take advantage of adaptive control. For example, if a circuit designer wants to save power on the chip, it may be advantageous to lower the supply voltage, VDD, and by the choice of the circuit components design the circuit in such a way that the rate of slowing down the data computations is greater than the rate at which the clock distribution slows down. This can be implemented using a monitoring structure that monitors the set-up conditions.

As previously described, set-up timing closure requires that data is stable at the input of a capture element 140 (e.g., at capture point 110) before a clock impulse (e.g., via capture clock signal 150) arrives that causes the capture element 140 to capture the data. In some cases, sensing circuit 160 can be used to monitor the capture point 110 for set-up errors and can be used in conjunction with an adaptive control as described in more detail with respect to FIGS. 2A and 2B, providing an adaptive monitoring structure.

Figure 2A:
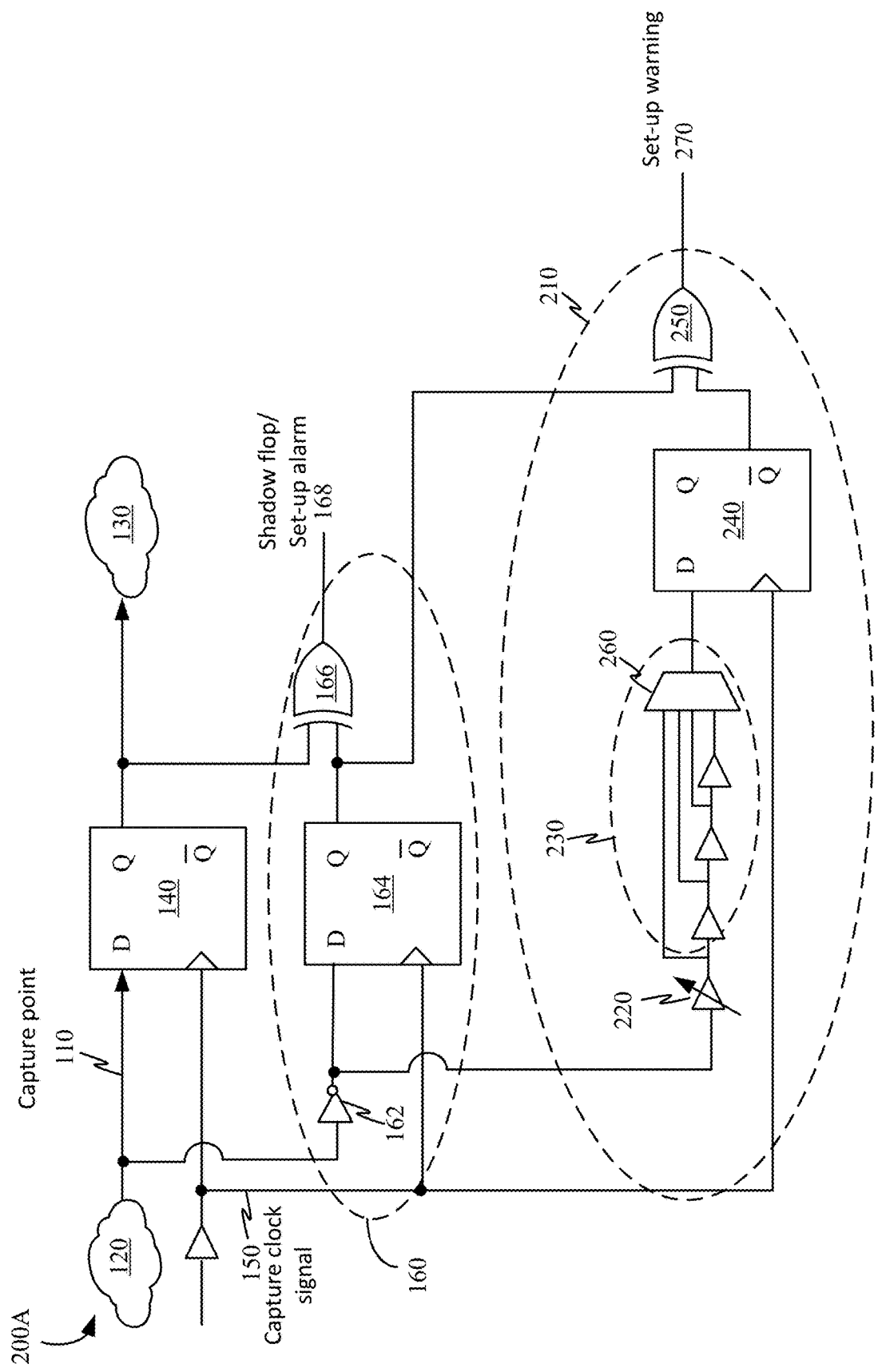
FIGS. 2A and 2B show example implementations of an adaptive monitoring structure that additionally monitors the set-up condition.
Figure 2B:
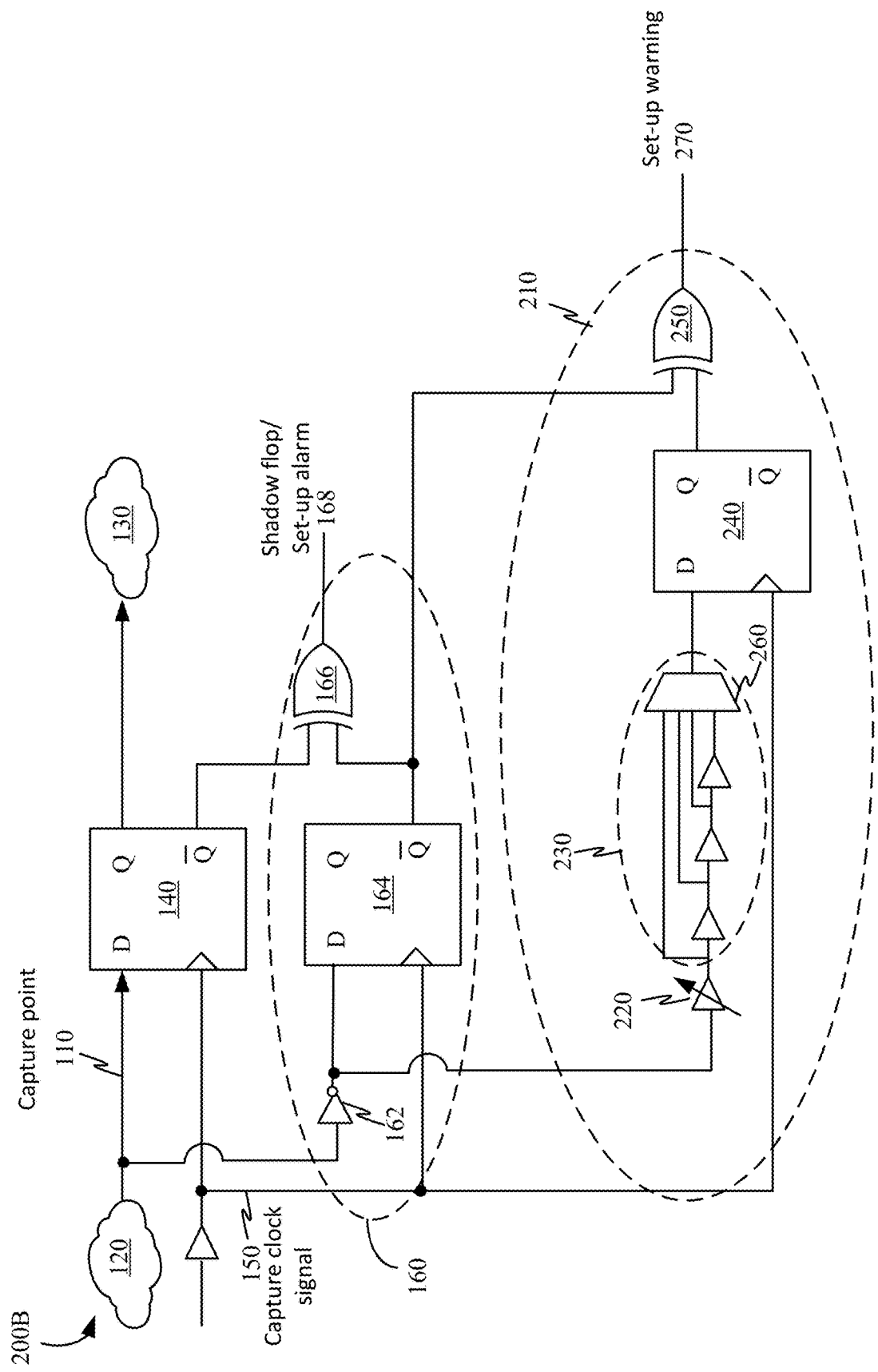

FIGS. 2A and 2B show example implementations of an adaptive monitoring structure that monitors the set-up condition. To minimize the load on the critical path, Q or Qbar can be used depending on which one has more timing margin. FIG. 2A illustrates the application of sensing path to the Q output of capture element 140; and FIG. 2B illustrates the application of sensing path to the Qbar output of capture element 140. Referring to FIGS. 2A and 2B, circuitry 200A and 200B includes the digital data path 120, capture element 140, and second stage 130 described with respect to FIG. 1A, sensing circuit 160 such as described with respect to FIG. 1B, and components for adaptive control of a monitoring structure (some of which utilize components of sensing circuit 160 and some of which include adaptive monitoring circuit 210). There may be a plurality of critical paths on a chip, with one of such paths and corresponding circuitry shown for simplicity in the figures. It can be understood that this plurality of critical paths on the chip can include any path that could exhibit the worst timing margin as a result of the data along the path and the random variations of components of the path in a specific physical circuit.

As illustrated in both FIG. 2A and FIG. 2B, the adaptive monitoring circuit 210 can include a first delay element 220, a second delay element 230, a set-up capture element 240, and a set-up warning comparison element 250. The first delay element 220 may be a delay buffer or other delay device that is coupled to receive an inverted signal of the capture point 110, which may be the same signal as input to the shadow capture element 164. The output of the first delay element 220 is fed into the second delay element 230, which includes a plurality of delay buffers or other delay devices and optionally a multiplexer (MUX) 260 (collectively 230) to provide additional buffering at the output of the first delay element 220. The number and sizes of delay buffers of the second delay element 230 are configured at a design stage. The MUX 260, when included, provides a programmable delay for the signal captured at the capture element 240. The second delay element 230 acts as a tunable delay and is configurable at runtime by a selection by the MUX 260. In some cases, first delay element 220 and the second delay element 230 can be combined into a single delay element.

Set-up capture element 240 may be a set-up flip flop or other capture device that latches the output of the MUX 260 until a next cycle of the capture clock signal 150. The set-up warning comparison element 250 may include a XOR logic gate or other comparison device that is coupled to the output of the set-up capture element 240 and the output of the shadow capture element 164. The set-up warning comparison element 250 outputs a set-up warning signal 270 when the desired timing margin is not met. In particular, the set-up warning comparison element 250 is coupled to compare the output of the set-up capture element 240 and a signal corresponding to an output of the shadow capture element 164, and is configured to output a set-up warning signal when the output of the set-up capture element 240 and, in this case, the output of the shadow capture element 164 do not satisfy an expected condition. Instead of coupling directly to the capture element 140, the adaptive monitoring circuit 210 is coupled to the input of shadow capture element 164, and the warning comparison element 250 to its output. This configuration is advantageous as it minimizes the load on the digital data paths 120 and 130. It should be noted that the set-up alarm signal 168 and the set-up warning signal 270 can have different definitions with respect to an alarm indicated by logic "1" or logic "0" depending on the whether the signals coupled to the respective capture elements are inverted or not. The expected condition can be that the values received at the input of the set-up warning comparison element 250 are the same, within a tolerance (e.g., within an expected variance of a value indicating a logical 1 or a logical 0).

A set-up warning signal 270 can be used to adapt voltage or operating frequency for the logic operations. In contrast to the alarms, which indicate errors (and which may be used to trigger different countermeasures), the warning signal can be used as a control input. The set-up warning signal 270 is designed to include sufficient timing margin for legitimate transient events without triggering an alarm; and allows for adapting the logic operations for temperature and voltage issues (as well as clock changes or environmental factors such as electromagnetic radiation or light). In some cases, a timing warning is triggered per clock cycle. In some of such cases, adaptation may be triggered after at least two consecutive warnings.

If the set-up alarm signal 168 is not output, but the set-up warning signal 270 is output, then one can consider the computation to still be correct, but that there was not enough timing margin to allow for the additional delays from the first delay element 220 and the second delay element 230.

The first delay element 220 is sized such that all of the critical paths have comparable average delay. For every critical path that is involved in the monitoring, the first delay element 220 is tuned slightly so the delay is adapted. The first delay element 220 is designed to be a certain fixed delay for every path, that is appropriate to the median delay of that path that makes all median delays of all monitored paths the same, within a delta (Δ). In other words, the first delay element 220 is configured to apply a delay that, during simulation of the critical path timing margins, causes a mean timing margin of the plurality of paths in the circuit to be within one minimum mean delay of a delay element. In some cases, the first delay element 220 can be considered to be a variable delay buffer during the simulation phase of the circuit until the sizing/value for the delay is determined. A method of deriving the delay for the first delay element 220 is described in detail with respect to FIGS. 4A, 4B, and 5. As mentioned above, the second delay element 230 is used to fine-tune the set-up margin. A designer can select any one or more of the delay buffers that form the second delay element 230 to provide additional delay (see e.g., method described with respect to FIG. 5). The first delay element 220 is configured and fixed during the design of the chip (e.g., circuitry 200). The second delay element 230 is configurable at runtime by a setting chosen by the MUX 260 (or may be predetermined during design/testing and established by selection via MUX 260).

Additional adaptive circuitry may include a toggle indicator. The toggle indicator ensures that the sensing and monitoring circuitry is able to recognize that the output from the first stage has switched since the illustrated sensing circuitry would not recognize a set-up error where between consecutive clock cycles the subsequent output of the first stage is the same value as the previous output of the first stage.

Figure 3A:
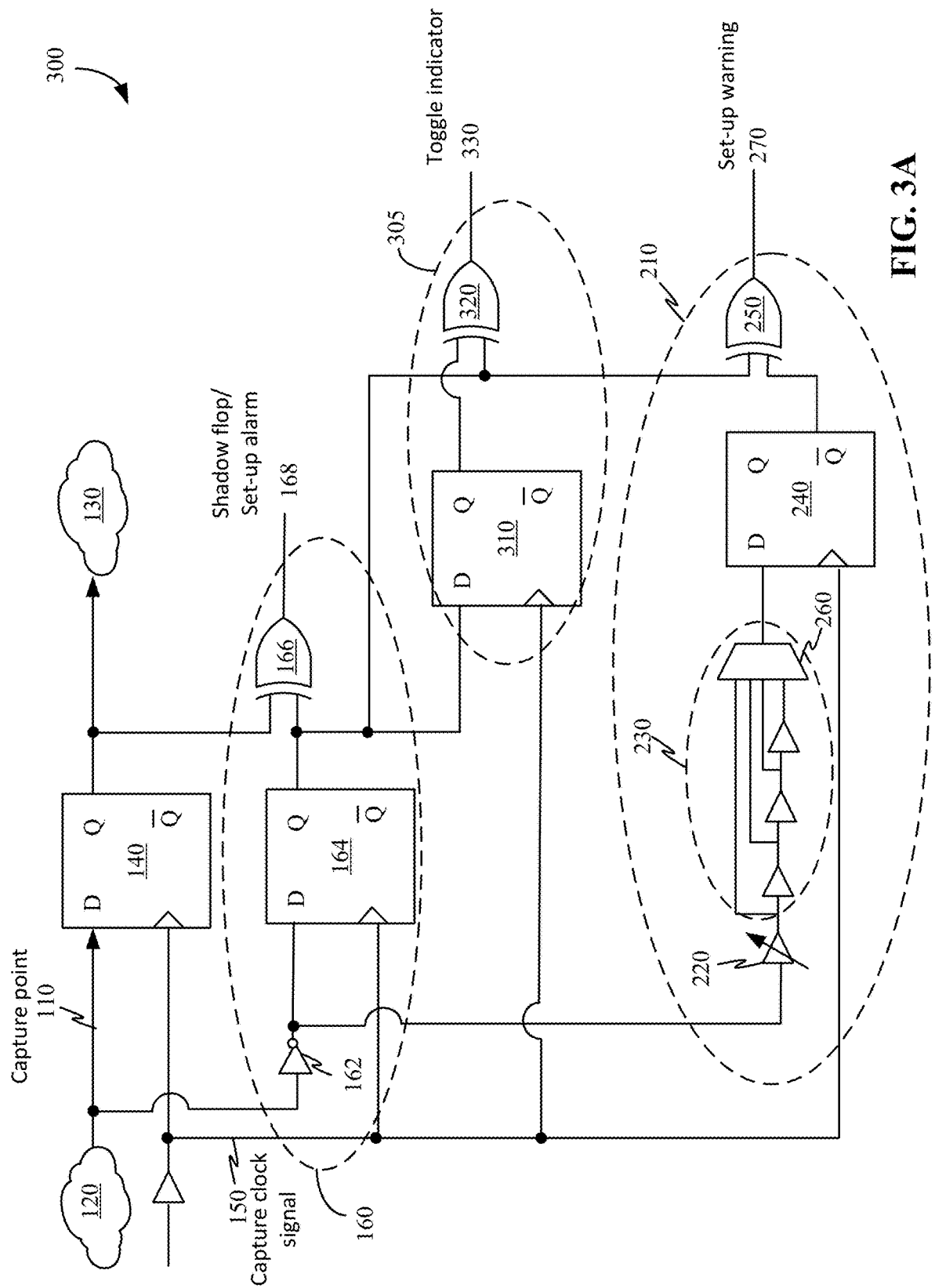
FIG. 3A shows an example implementation of an adaptive monitoring structure for set-up timing with an additional toggle indicator.

FIG. 3A shows an example implementation of an adaptive monitoring structure for set-up timing with an additional toggle indicator. Referring to FIG. 3A, circuitry 300 includes the digital data path 120, capture element 140, and second stage 130 described with respect to FIG. 1A, sensing circuit 160 such as described with respect to FIG. 1B, components for adaptive control of a monitoring structure such as described with respect to FIG. 2A, and toggle indicator circuitry 305. There may be a plurality of critical paths on a chip, with one of such paths and corresponding circuitry shown for simplicity in FIG. 3A.

The toggle indicator circuitry 305 is coupled to the sensing circuit 160 and includes a toggle indicator capture element 310 (e.g., flip flop or other capture device) and a toggle indicator comparison element 320 (e.g., a XOR logic gate or other comparison device). The toggle indicator checks if a previous computation output is the same as the current computation output. In the illustrated case, the toggle indicator capture element 310 receives the output of the shadow capture element 164 and feeds its output from the previous computation value into the toggle indicator comparison element 320 according to the timing of the capture clock signal 150. The toggle indicator comparison element 320 compares the output of the toggle indicator capture element 310 with the current computation value output from the shadow capture element 164 and outputs the toggle indicator signal 330 if the data path has been switched in a clock cycle. That is, the toggle indicator comparison element 320 is coupled to compare an output of the toggle indicator capture element 310 and the output of the shadow capture element 164, and is configured to output a toggle indicator signal 330 when the output of the toggle indicator capture element 310 and the output of the shadow capture element 164 do not satisfy an expected condition. The expected condition can be that the values received at the input of the toggle indicator comparison element 320 are the same, within a tolerance (e.g., within an expected variance of a value indicating a logical 1 or a logical 0).

The toggle indicator signal 330 enables a system acting on the alarms/signals from the various sensing circuitry to generate statistical information on the number of warnings (e.g., of set-up warning 270) received from the plurality of critical path monitors used within a digital design, relative to the number of paths on which the captured data changed within a clock cycle. In general, the toggle indicator is coupled to a signal corresponding to an output of capture element 140, which may directly be the output of capture element 140 (see FIG. 7) or is an output of a corresponding signal such as the output of shadow capture element 164 as illustrated in this example (it should also be noted that the connections for the sensing circuit 160 and adaptive monitoring circuit 210 could be as illustrated in FIG. 2B).

Figure 3B:
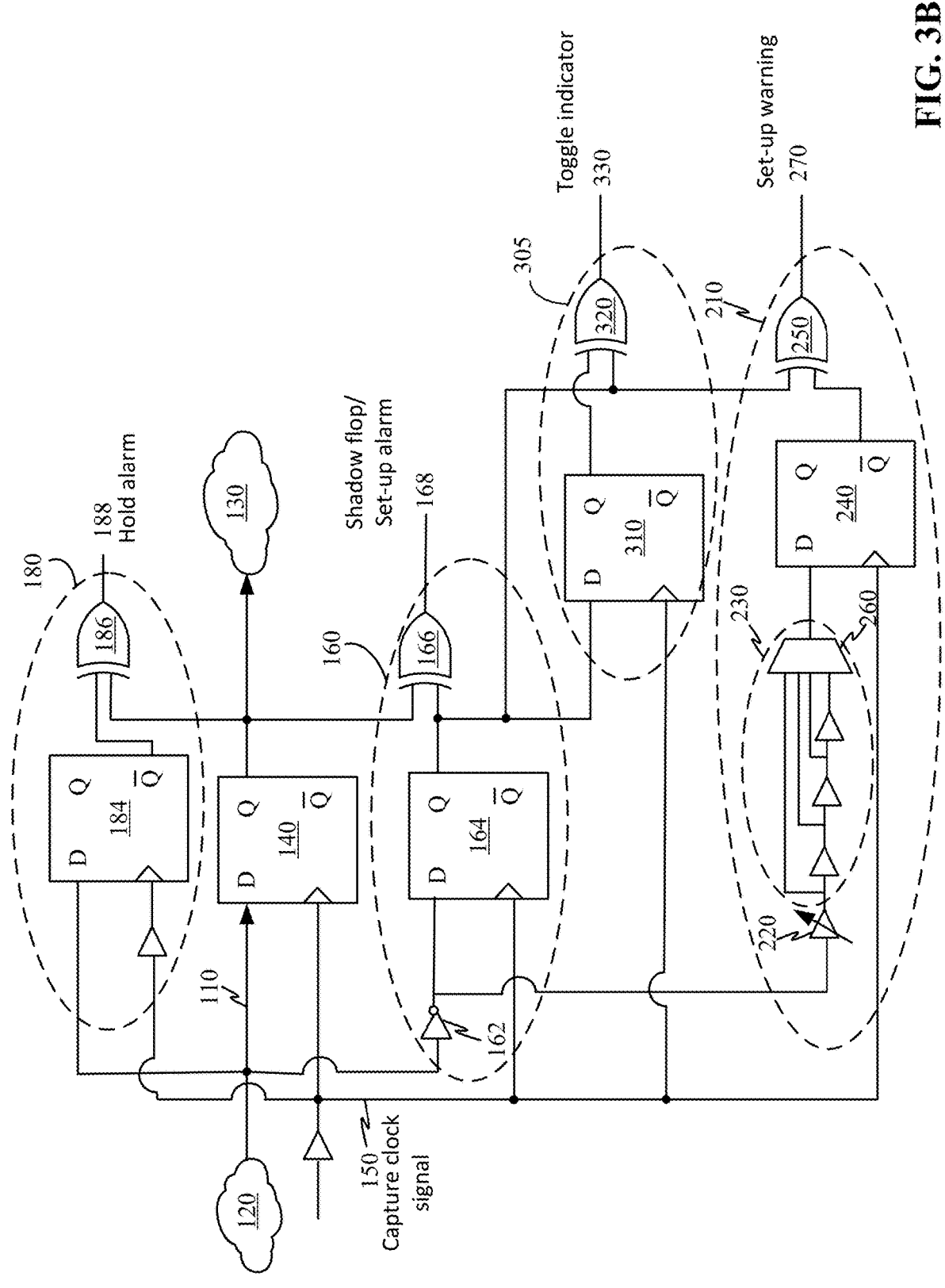
FIG. 3B shows an example implementation of an adaptive monitoring circuit with the addition of a hold alarm circuit.

FIG. 3B shows an example implementation of an adaptive monitoring circuit with the addition of a hold alarm circuit. Referring to FIG. 3B, circuitry 350 includes the digital data path 120, capture element 140, and second stage 130 described with respect to FIG. 1A, sensing circuit 160 such as described with respect to FIG. 1B, hold alarm circuit 180 such as described with respect to FIG. 1C, components for adaptive control of a monitoring structure such as described with respect to FIG. 2A, and toggle indicator circuitry 305 such as described with respect to FIG. 3A. There may be a plurality of critical paths on a chip, with one of such paths and corresponding circuitry shown for simplicity in FIG. 3B. It should also be noted that the connections for the sensing circuit 160 and adaptive monitoring circuit 210 could be as illustrated in FIG. 2B.

As discussed above, there are a number of paths that may be on a chip. Critical paths are paths that within the design have the tendency to have the slowest computation time relative to the arrival of the clock signal. One may not know exactly which path will result in a critical path delay as the components used to build each part are subject to statistical variations of their characteristics. Critical paths have the least timing margin compared to other paths in a circuit. The critical path delay is subject to a random variation amongst chips due to process variation and even within the same chip due to process non-uniformity over the die area as well as random statistical variations. For example, the delay of two identically designed paths will be slightly different.

FIG. 4A shows a graph of example simulated timing distributions of critical path delays for identically designed paths affected by random local variations following the insertion of a first delay element (e.g., first delay element 220); and FIG. 4B shows a graph of example timing distributions of the paths of FIG. 4A that have been adjusted to match their mean timing after insertion of the first delay element and second delay element of an adaptive monitoring circuit. Timing sign-off simulation may identify a number of paths, N, that have tight timing margins.

Referring to FIG. 4A, N=22 critical paths are monitored. The graph shows the cumulative probability of the timing delay for each of the N=22 paths. All of the paths have a 50% cumulative probability at 2.2 arbitrary time units (AU) across random local variation. This represents a median timing of 2.2 A.U. for each of the N paths. This is achieved by inserting the first delay element 220 onto each of the N=22 paths to ensure each path has the same median delay in silicon. The most critical path out of the N=22 paths (e.g., the path with the smallest timing margin on the data path 120—found as the median) can be determined during simulation. The most critical path should not require any additional delay. A delay, provided by the first delay element 220, can be added to each of the 21 remaining paths to make the average delay the comparable across all 22 paths.

Due to random variation, specific paths on some chips will have more margin than others. Referring to FIG. 4A, curve 400 has more variation, σ, than other paths. Conventional sign-off ensures that there is sufficient delay margin for the most critical path under all conditions across all chips, such that the computation is not corrupted. Typically, set-up time is closed at 3σ random variation, which means that for 99.73% of chips, the critical path will be guaranteed to meet its timing under the worst-case PVT corner condition. For adaptive operation it is important to generate a reliable control signal that does not rely on only a single critical path providing a warning for the system to act upon. To achieve this, the second delay elements 230 can be tuned to offset the distribution in FIG. 4B to the 3σ point of the path with the highest variation from FIG. 4A. In the example graph of FIG. 4B, the 3σ point is at 2.5 AU. The second delay elements 230 can make the 3σ point measurable reliably.

On silicon, the actual worst-case path is unknown. This can cause measurement of the worst-case path to be difficult. The second delay elements 230 can be used to push the median of the sensed paths to the 3σ point. Without any delay elements 220 and 230, the real critical timing path 400 will have more than 3σ confidence of having correct timing. As can be seen in FIG. 4B, the mean timing of all paths is adjusted to the 3σ point at 2.5 AU. A window can be defined around 2.5 AU delay from which the circuit operation can be regulated (e.g., adapted).

Determining the amount of adaptable delay for a set-up condition occurs during simulation of the design.

Figure 5:
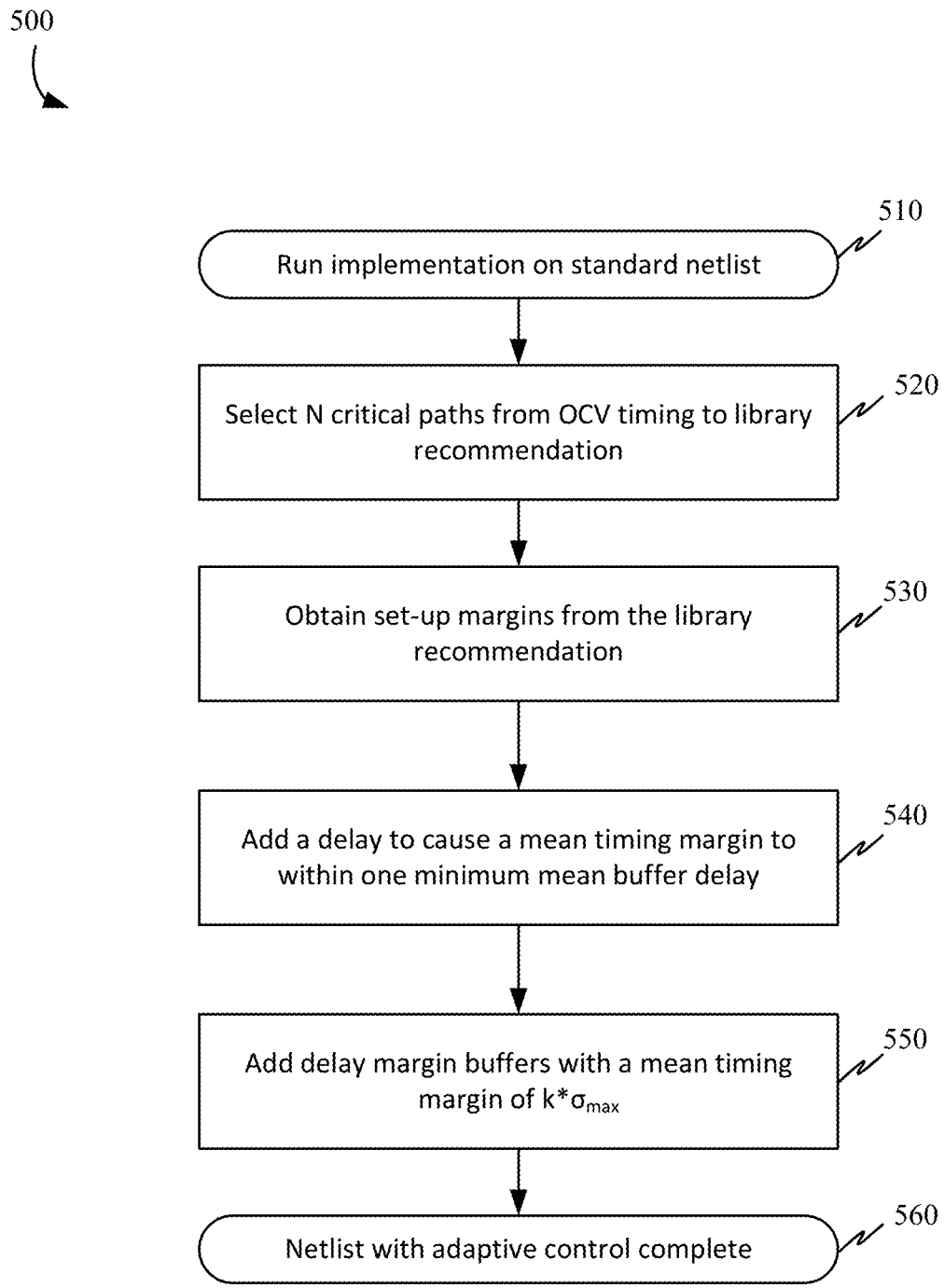
FIG. 5 shows a process flow for designing adaptive control monitoring circuitry.

FIG. 5 shows a process flow for designing adaptive control monitoring circuitry. The process flow 500 begins with running (510) a circuit implementation on a standard netlist. N critical paths can be selected (520) for monitoring based on the sign-off and on-chip variation (OCV) methodology specified for the digital library and including a mixture of paths limited by transistor delay and interconnect wire delay, resulting in τ(i) and σ(i) to describe the mean delay and delay variation of each path. In some cases, an automatic place and route tool is used as part of performing operation 510. Timing statistics can then be generated. For example, timing slack is generated for all paths, with values provided for worst negative slack (WNS) and total negative slack (TNS). WNS is the timing gap on the most critical path. TNS is the sum of all gaps in timing across all paths that fail to close timing. The recommended margins to account for dynamic variations of voltage and temperature c can be considered (530) For each path i, a delay can be added (540) (e.g., first delay element 220) to cause a mean timing of the N critical paths to be within one minimum mean delay of a delay element (e.g., even out the mean timing margin to within one mean inverter or buffer delay). Next, additional delay margin buffers can be added (550) (e.g., second delay element 230) with a mean timing of $k*\sigma_{max}$, whereby $\sigma_{max}$ is the worst delay variation amongst the N paths considered and k is the set-up margin used for timing closure (e.g., typically k=3). Once the delays have been added (operations 540, 550), a netlist including the adaptive control circuitry can be generated (560).

Figure 6A:
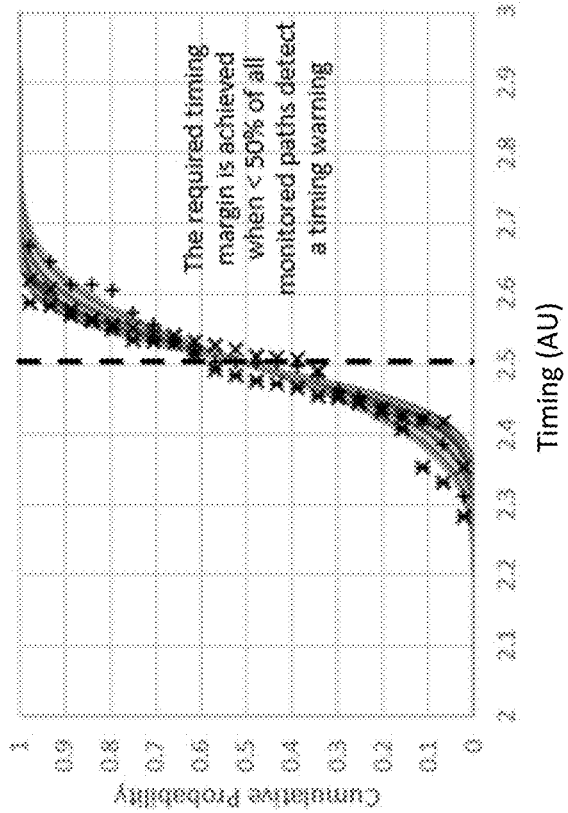
FIGS. 6A and 6B show cumulative distribution graphs, where each "X" represents a sample of the cumulative distribution representing a particular data path, including its individual local variation on a die.
Figure 6B:
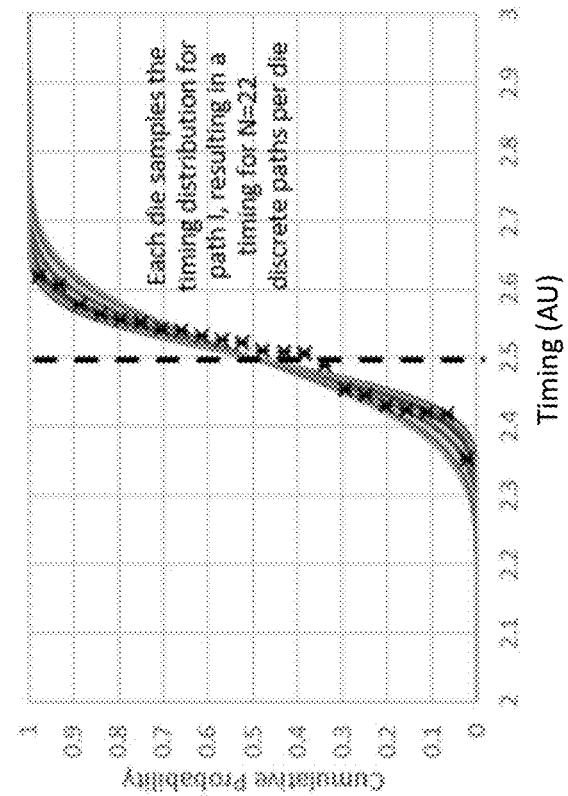

FIG. 6A and FIG. 6B show cumulative distribution graphs, where each "X" represents a sample of the cumulative distribution representing a particular data path, including its individual local variation on a die. As with FIGS. 4A and 4B, N=22 paths. During operation, the adaptive system can track the point on the graph in which the timing is 2.5 AU, which is the mean timing of the paths. The point to which the system should be controlled to keep the desired timing margin for the functional circuit is one in where 50% of the paths that are sensed and toggle fire an alarm and 50% of the paths that are sensed and toggle do not fire an alarm. Fifty percent of the paths will have a mean timing greater than 2.5 AU and 50% of the paths will have a mean timing less than 2.5 AU. This gives a near-continuous control metric to regulate the system to. For example, FIG. 6B shows a plot of the distribution for critical path timing on three chips. Chip fabrication results on taking one sample of the distribution for each patch instance. The certainty in which the median can be determined is much tighter, and thus more reliable, than the ability to determine the 3σ point. Rather than acting on one path that either fires an alarm or not, there is an expectation that approximately 50% of the paths are failing. A window can be designed around this expectation to regulate the system.

Assuming that all paths toggle at each clock cycle, the required timing margin can be achieved with <N/2 paths detecting a warning. When considering the scenario in which not every path being monitored may toggle, the toggle rate R is included. To consider the toggle rate for each path, fewer than R*N/2 should detect a warning. The toggle rate can either be estimated or derived by summing the N toggle indicator flags 330 such as described with respect to FIG. 3A. This gives the expectation for how many paths should detect a warning. If the system regulates poorly, the shadow flop/setup alarm 168 will fire, indicating a timing problem with the timing of the adaptive monitoring circuit 210.

Figure 7:
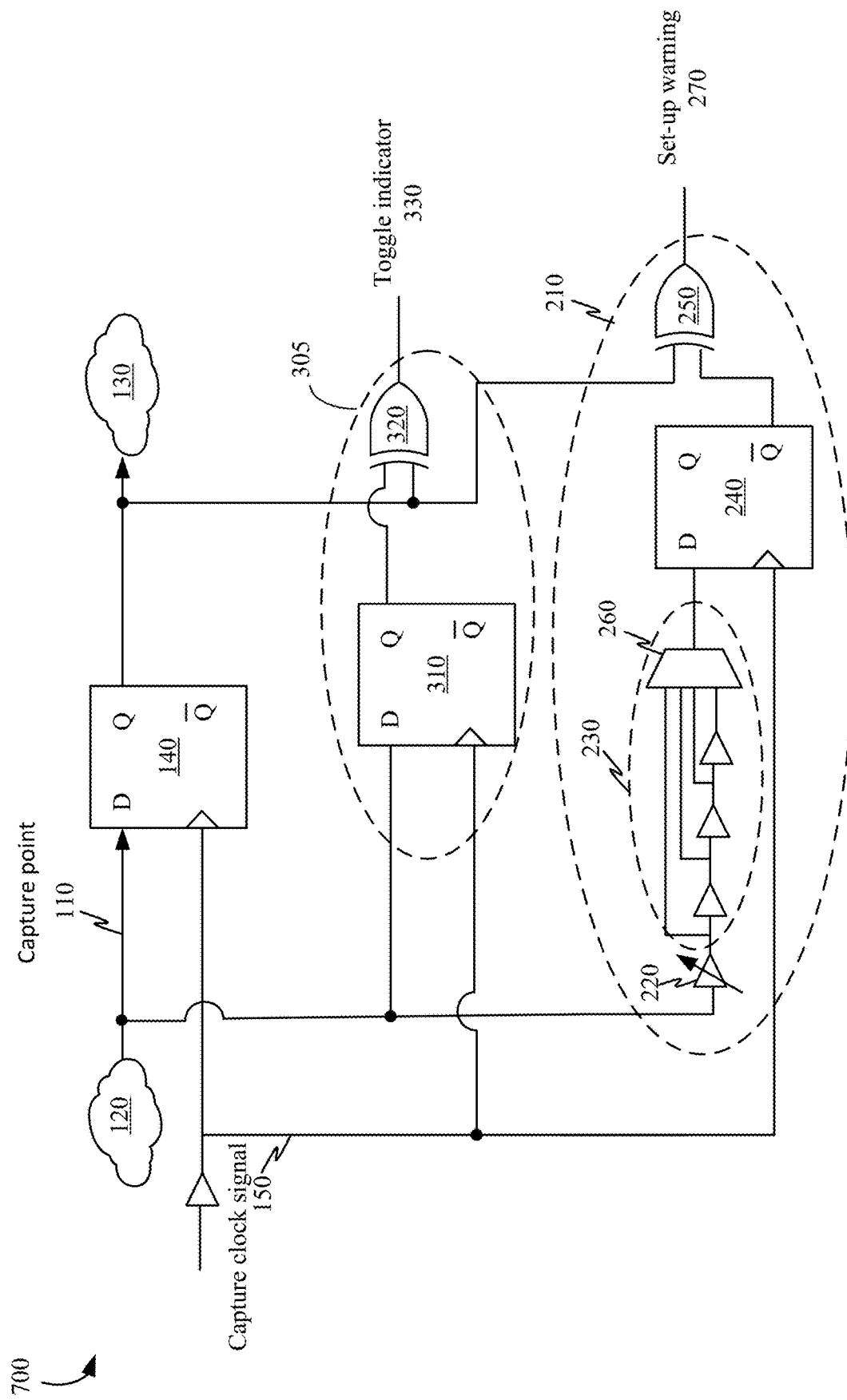
FIG. 7 shows a simplified adaptive monitoring structure used in applications that include a set-up warning, but not require other alarms.

FIG. 7 shows a simplified adaptive monitoring structure used in applications that include a set-up warning, but not require other alarms. Referring to FIG. 7, the circuitry 700 includes the adaptive monitoring circuit 210 described with respect to FIG. 2A and, optionally, toggle indicator circuitry 305 described with respect to FIG. 3A in addition to the digital data path 120, capture element 140, and second stage 130 of FIG. 1A. In some cases, such as illustrated in FIG. 7, instead of the adaptive monitoring circuit 210 being coupled to receive an inverted output of the first stage 120, the adaptive monitoring circuit 210 can be coupled to directly receive the output of the first stage 120. Similarly, instead of the toggle indicator comparison element 320 of the toggle indicator circuitry 305 being coupled to an output of a shadow capture element 164 of a sensing circuit, the toggle indicator comparison element 320 can be coupled directly to an output of capture element 140. The circuitry 700 simply manages the timing margin without detecting a failure, such as hold or set-up failures. In some implementations, a delay element is included at capture point 110 to reduce the loading on the data path 120. In some cases, the sensing path from the output of capture element 140 can be on Qbar as described and illustrated with respect to FIG. 2B.

Certain design implementations, for example, circuits supplied by on-die switched capacitor power converters, can produce a choppy, fluctuating supply voltage due to the discontinuous nature of the power conversion. In such cases, conventional sign-off must be based on highly conservative assumptions for the amount of timing margin that is assumed at the time of design. In contrast, the techniques described herein enables more flexibility.

Figure 8A:
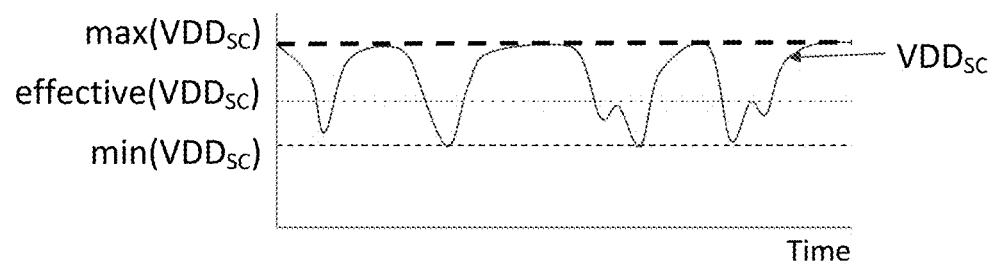
FIG. 8A shows a voltage graph for a supply rail generated by a switched capacitor power converter.

FIG. 8A shows a voltage graph for a supply rail generated by a switched capacitor power converter. The graph shows that the voltage curve, $VDD_{SC}$, tends to go between max ($VDD_{SC}$) and a minimum voltage, $min(VDD_{SC})$. The voltage curve, $VDD_{SC}$ dips down to $min(VDD_{SC})$ during switching operations and rises towards $max(VDD_{SC})$ upon completion of switching operations. The amount of voltage drop is a function of the operation.

Timing monitors can detect whether there is enough timing margin in the design despite the voltage variation that makes the $VDD_{SC}$ curve so choppy. A critical quantity for the power dissipation introduced by the power converter is the acceptable voltage drop, $\Delta VDD$. The worst case for power, best for timing is if the $\Delta VDD$ is very high, indicating the voltage, $VDD_{SC}$, has dropped to a very low value. The best case for power, worst for timing is if the $\Delta VDD$ is very low, indicating almost no drop in $VDD_{SC}$. The tradeoff is the switching frequency, which is how often the internal voltage supply rail is recharged. If the internal voltage supply rail is recharged infrequently, $F_{min}$, then $\Delta VDD$ will be high. Conversely, when the frequency of the recharging is increased, $F_{max}$, then $\Delta VDD$ will be lower. The power overhead of the converter is directly proportional to the switching frequency.

Figure 8B:
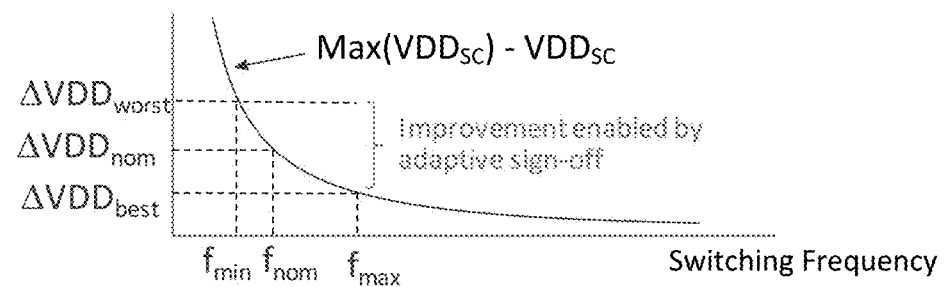
FIG. 8B shows a graph of the switching frequency of a switched capacitor power converter relative to ΔVDD.

FIG. 8B shows a graph of the switching frequency of a switched capacitor power converter relative to $\Delta VDD$. The graph shows that the highest switching frequency, fmax, has the best $\Delta VDD$ for sign-off. However, fmax also results in the highest power consumption. For better power consumption, it is optimal that the switching frequency be as far to the left on the curve as long as there is sign-off margin. A designer can use adaptive feedback between the sensors described herein and the switching frequency to achieve better power consumption. For example, if 50% of the sensors are providing a set-up warning, then the system is operating optimally. If too many sensors provide a set-up warning, then the designer knows VDD is dropping too much and the frequency should to be increased. Likewise, if too few sensors provide a set-up warning, then the designer knows there is margin in the current setup and the switching frequency could be reduced.

Referring back to the circuitry of FIG. 7, the adaptive monitoring circuit 210 and toggle indicator circuitry 305 can be useful not only in determining the critical path timing in any kind of circuit, but in the case of the switched capacitor power converter, the circuitry can also determine an optimal switching frequency. For example, if a plurality of the monitors indicates large timing margins under a given set of processing conditions, the switching frequency of the converter can be adapted to lower the power consumption while still guaranteeing timing. More generally, this same type of control mechanism could be used to change the entire chip voltage (e.g., adaptive voltage scaling), body-bias (e.g., adaptive body biasing), or the clock frequency while still guaranteeing timing.

Figure 9:
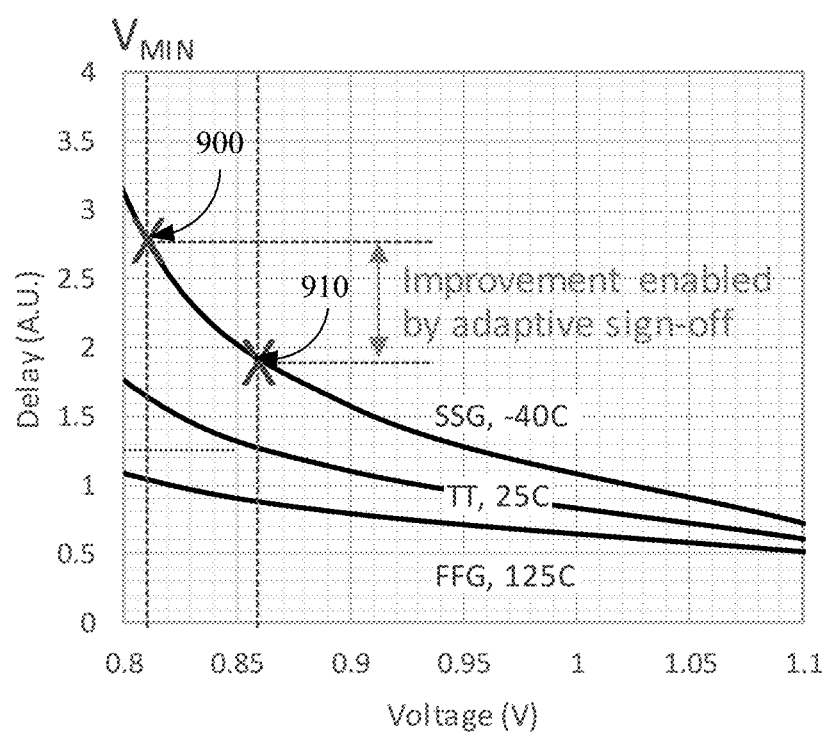
FIG. 9 shows a graph of circuit delay at different voltage values.

FIG. 9 shows a graph of circuit delay at different voltage values. Circuit delays can become increasingly sensitive to voltage as the voltage value decreases.

The three curves in FIG. 9 show the dependence of switching delay on process and temperature drawn over voltage. The worst point on the graph is when the process is slow and the temperature is low, resulting in high delay. The graph also shows on the 'SSG, −40 C' curve that the delay can be improved from the worst point at approximately 2.8 AU (at Vmin) to a delay of approximately 1.9 AU (at 0.86 V) by using adaptive system control. In conventional sign-off, the design should close timing at the point 900 with a 0.9 V nominal voltage. In conventional sign-off, this means a delay of 2.8 AU must be tolerated. Using adaptive system control, the timing variation over corners can be reduced, for example to be guaranteed better than at point 910, which has a delay of 1.9 AU. This means that the voltage can be increased by the equivalent of approximately 50 mV; and increasing the voltage by just 50 mV when the temperature is low (in this case −40 C) gives approximately a 25-30% improvement in speed. If the same adaptation were performed at 1V, the difference in speed would be much smaller because the dependence of the switching speed on voltage is a function of the value of the supply voltage relative to the transistor threshold voltage $V_{TH}$. Adaptive system control becomes increasingly more important when operating at lower voltages, which is generally a way to lower power consumption.

During operation of a circuit, a method for regulating the circuit for voltage or operating frequency variation can be accomplished using a monitoring system for monitoring delay of critical path timing margins such as described with respect to any of FIGS. 2A, 2B, 3A, 3B, and 7. Adjustments to the frequency or voltage can be made by an adaptive mechanism until a certain number of set-up warnings are issued across the paths in the circuit having the described monitoring system coupled thereto (e.g., a number of set-up warning signals of less than N/(2S), where N is a total number of the adaptive monitoring circuits and S is a number of paths that toggled). In some cases, once the certain number of set-up warnings are issued, the adaptive mechanism (e.g., to adjust operating/switching frequency, to adjust the voltage level) can be set, or "locked", to maintain the certain value for voltage or frequency.

Figure 10:
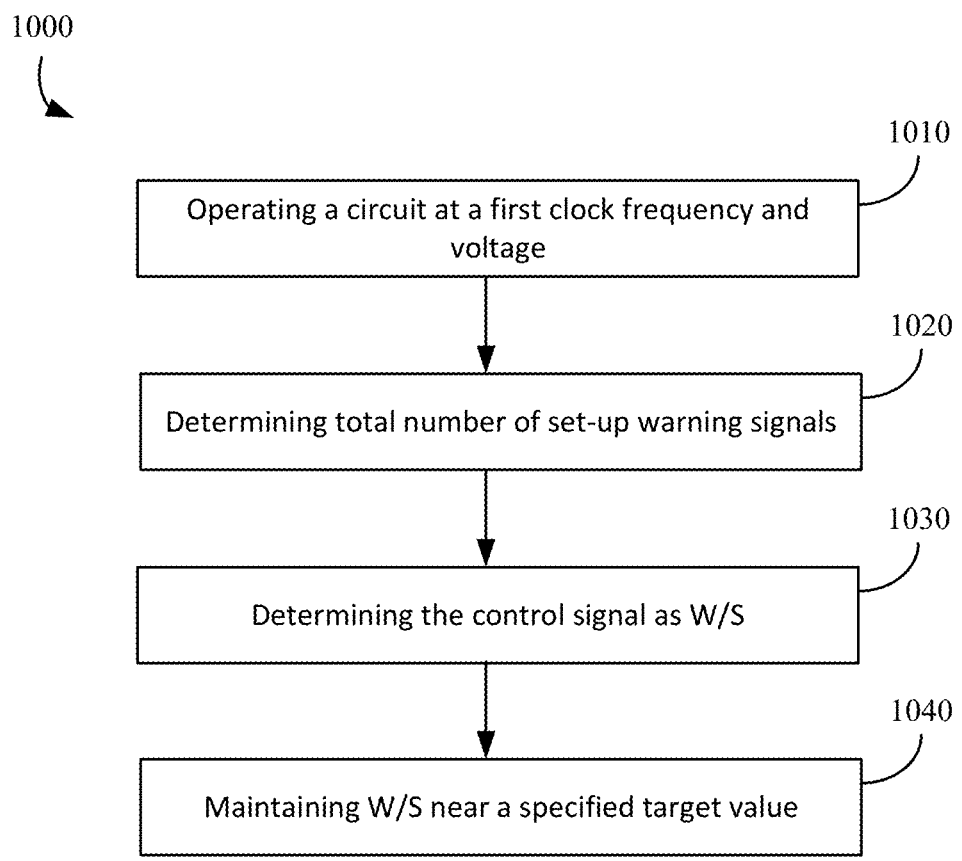
FIG. 10 shows a process flow based on a non-binary, multi-level control signal for adapting operating parameters of a circuit that affects timing margin of a digital circuit.

FIG. 10 shows a process flow based on a non-binary, multi-level control signal for adapting operating parameters of a circuit that affects timing margin of a digital circuit. The circuit that affects timing margin of a digital circuit may be a voltage regulator as an example. Process 1000 can include operating (1010) the circuit at a first clock frequency and voltage. A total number of set-up warning signals can be determined (1020) from a plurality of adaptive monitoring circuits during the operation of the circuit at the first clock frequency and voltage. Each adaptive monitoring circuit of the plurality of adaptive monitoring circuits can be coupled to a corresponding one of a plurality of paths in the circuit and may be in the form as described with respect to FIGS. 3A and 7. The total number of paths in the circuit that is monitored can be referred to as N. The control signal can then be determined (1030) as W/S, where W is the total number of set-up warning signals received per clock cycle and S is the number of paths that toggled. The control signal is then maintained (1040) near a specified target value by adapting operating parameters of the circuit. For example, the voltage or frequency of the circuit can be adjusted. In some cases, the specified target value for the control signal W/S is 0.5.

To maintain safe set-up timing margin the system needs to operate such that a specified number of toggling paths generate timing warnings in each clock cycle of digital circuit operation.

Figure 11:
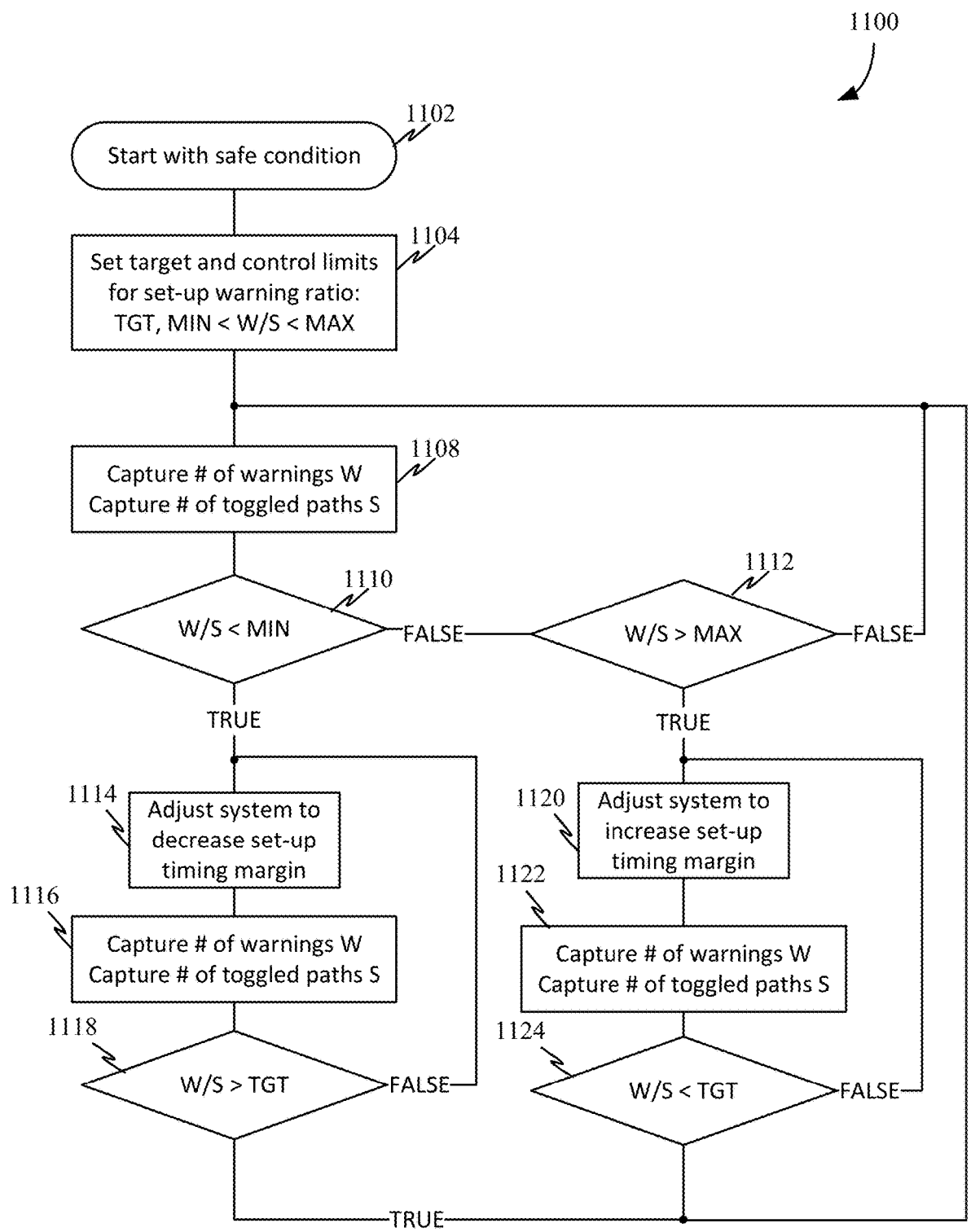
FIG. 11 shows an example implementation of the process of FIG. 10.

FIG. 11 shows an example implementation of the process of FIG. 10. In process 1100, the ratio of set-up warnings W/S are kept in a target range. Referring to FIG. 11, process 1100 can begin with a set-up safe condition (1102). The safe condition can be, for example, a low clock frequency, a high supply voltage, or accelerating by body bias. Targets (TGTs) and control limits (e.g., MIN<W/S<MAX) are set (1104). If W/S is between MIN and MAX, adjustments are made until W/S is one step over the target. Once the set-up is finished, a loop starts with capturing W and S and this loop may be monitored periodically or continuously, where a limit violation causes a readjustment towards the target.

In particular, the number of warnings W and the number of toggled paths S are captured (1108). The targets and limits are monitored for each capture of W and S. A determination is made as to whether W/S is between MIN and MAX. For example, to test the first boundary condition, a determination (1110) is made whether W/S is less than MIN. If W/S is within the boundary condition by not being less than MIN, the system tests the second boundary condition by making a determination (1112) whether W/S is greater than MAX. If W/S is within the boundary condition by not being greater than MAX, the system stays in the main loop of capturing W and S.

If during operation 1110, W/S is determined to be less than MIN, the system adjusts (1114) to decrease the set-up timing margin and the number of warnings W and the number of toggled paths S are captured (1116) again. A determination (1118) is then made whether W/S is greater than TGT. If there is a limit violation (e.g., W/S is not greater than TGT), the system performs a small loop to adjust (1114) the system to further decrease the set-up timing margin, recapture (1116) W and S, and recheck TGT limits in determination 1118 until W/S is greater than TGT, at which time the system reverts to the main loop.

Similarly, if during operation 1112, W/S is determined to be greater than MAX, the system adjusts (1120) to increase the set-up timing margin and the number of warnings W and the number of toggled paths S are captured (1122) again. A determination (1124) is then made whether W/S is less than TGT. If there is a limit violation (e.g., W/S is not less than TGT), the system performs a small loop to adjust (1120) the system to further increase the set-up timing margin, recapture (1122) W and S, and recheck TGT limits in determination 1124 until W/S is less than TGT, at which time the system reverts to the main loop.

Figure 12:
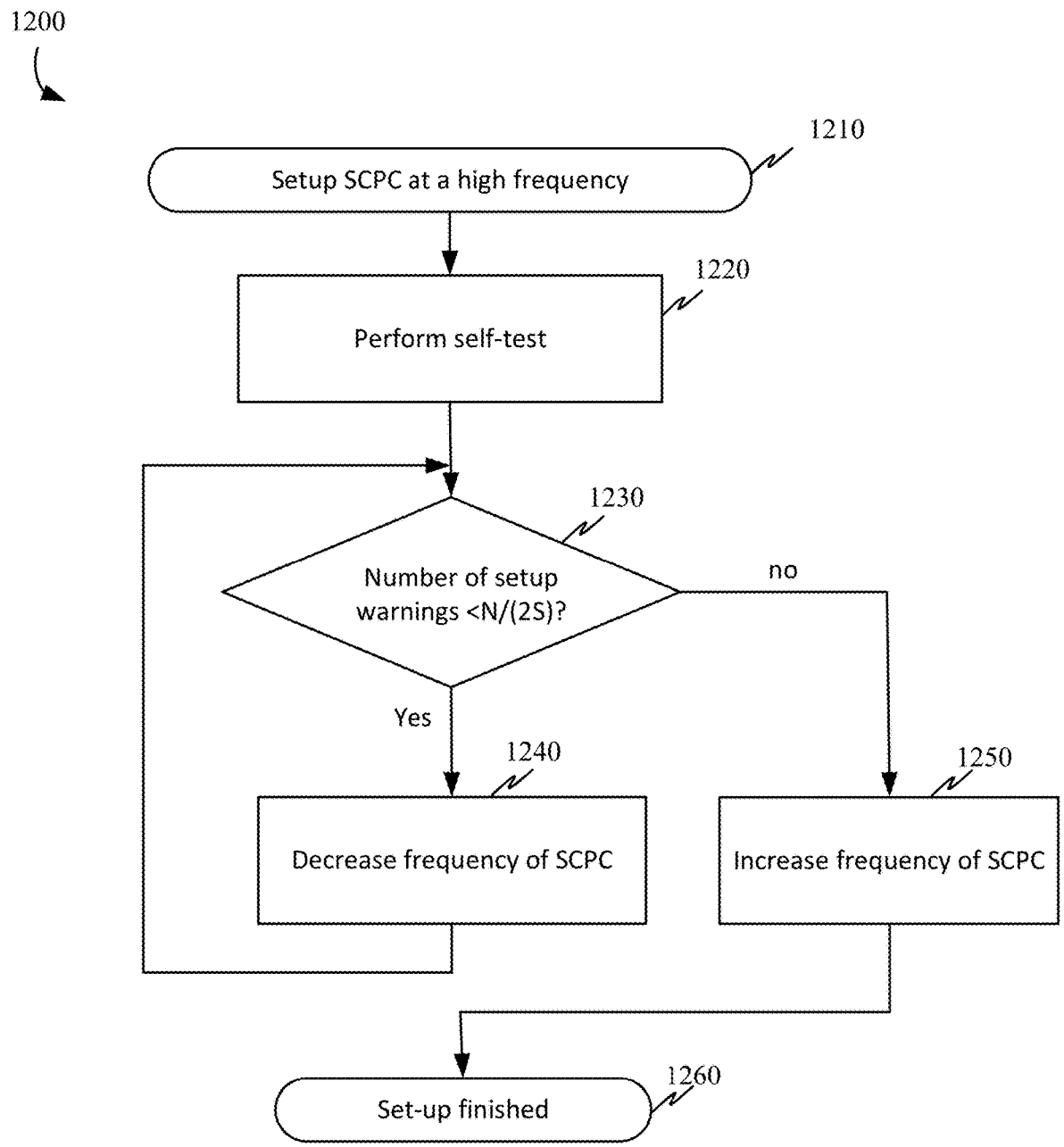
FIG. 12 shows a process flow of a method for controlling the switching frequency for charge transfer in a switched capacitor power converter (SCPC).

An example for process 1000 for a switched capacitor power converter is shown in FIG. 12.

FIG. 12 shows a process flow of a method for controlling the switching frequency for charge transfer in a switched capacitor power converter (SCPC). The process 1200 begins with setting up the SCPC to run at a high frequency (1210). After initial set-up of the frequency for the SCPC, a self-test (1220) using a max power test vector can be carried out, for example by executing a compute task that generates a toggle rate resulting in a high load current. For each cycle of the test vector, the number of critical paths that toggled are computed as (S) and "locked" can be set to FALSE. The number of paths that toggled (S) may be computed from the toggle indicator signals (e.g., toggle indicator signal 330 of each monitoring circuit as described with respect to FIGS. 3A and 7). A determination is made (1230) as to whether the number of set-up warnings (W) from the plurality of paths in the SCPC that have the monitoring system is less than N/2S or greater than or equal to N/2S for that cycle of the test vector. In some cases, the MIN and MAX values described with respect to FIG. 11 may be used.

When the number of set-up warnings is less than the N/2S threshold in normal operation, the supply voltage $VDD_{SC}$ can be decreased by, for example, reducing the SCPC frequency (1240) and the determination (1230) is repeated in a feedback loop until the number of set-up warnings is not less than the N/2S threshold. When the number of set-up warnings does exceed the N/2S threshold in normal operation (e.g., is equal to or greater than N/2S), the supply voltage $VDD_{SC}$ can be increased by increasing the SCPC frequency (1250). In some cases, the adaptive mechanism controlling the frequency for the SCPC can also be set in operation 1250 to a locked state (e.g., "locked" equal to "1"). This completes the set-up of the SCPC (1260) and normal operations can begin or resume.

While the above example is directed to a switched capacitor power converter, it should be understood that these are illustrative examples only and adaptive sign-off can be tailored to any design and is not limited to a specific type of regulator.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A monitoring system for monitoring delay of critical path timing margins for a circuit, comprising:
a plurality of adaptive monitoring circuits, each adaptive monitoring circuit coupled to a corresponding one of a plurality of paths in a circuit, each adaptive monitoring circuit comprising:
a delay element receiving a signal corresponding to an output of a first stage of computation of the corresponding one of the plurality of paths in the circuit, wherein the delay element comprises a first delay element and a second delay element, wherein the first delay element is configured to apply a delay that, during simulation of circuit timing for the circuit, causes a mean timing of the plurality of paths in the circuit to be within one minimum mean delay element delay, wherein the second delay element comprises one or more delay buffers;
a set-up capture element capturing an output of the delay element at a rising edge of a same clock signal used to capture the output of the first stage of computation for an endpoint;

a multiplexer coupled to select any of the one or more delay buffers of the second delay element and provide the output to the set-up capture element and a set-up warning comparison element coupled to compare an output of the set-up capture element and a signal corresponding to an output of a capture element of the corresponding one of the plurality of paths in the circuit, the set-up warning comparison element configured to output a set-up warning signal when the output of the set-up capture element and the signal corresponding to the output of the capture element do not satisfy an expected condition.

2. The monitoring system of claim 1, wherein the first delay element is configured to apply a delay that, during simulation of circuit timing for the circuit, causes a mean timing of the plurality of paths in the circuit to be within one minimum mean delay element delay.

3. The monitoring system of claim 1, wherein the one or more delay buffers are configured to add a mean timing of $k*\sigma_{max}$, wherein k is a set-up margin used for timing closure during simulation and $\sigma_{max}$ is a worst statistical delay variation amongst the plurality of paths during simulation.

4. The monitoring system of claim 1, wherein the set-up capture element is a flip flop.

5. The monitoring system of claim 1, wherein the set-up warning comparison element comprises a XOR gate.

6. The monitoring system of claim 1, further comprising:
a plurality of hold alarm circuits, each hold alarm circuit coupled to a corresponding one of the plurality of paths in the circuit.

7. A monitoring system for monitoring delay of critical path timing margins for a circuit, comprising:
a plurality of adaptive monitoring circuits, each adaptive monitoring circuit coupled to a corresponding one of a plurality of paths in a circuit, each adaptive monitoring circuit comprising:
a delay element receiving a signal corresponding to an output of a first stage of computation of the corresponding one of the plurality of paths in the circuit
a set-up capture element capturing an output of the delay element at a rising edge of a same clock signal used to capture the output of the first stage of computation for an endpoint and
a set-up warning comparison element coupled to compare an output of the set-up capture element and a signal corresponding to an output of a capture element of the corresponding one of the plurality of paths in the circuit, the set-up warning comparison element configured to output a set-up warning signal when the output of the set-up capture element and the signal corresponding to the output of the capture element do not satisfy an expected condition; and
a plurality of toggle indicator circuits, each toggle indicator circuit coupled to a corresponding adaptive monitoring circuit of the plurality of adaptive monitoring circuits and coupled to the corresponding one of the plurality of paths in the circuit, each toggle indicator circuit comprising:
a toggle indicator capture element coupled to capture the signal corresponding to the output of the capture element at the rising edge of the same clock signal used to capture the output of the first stage of computation for the endpoint; and
a toggle indicator comparison element coupled to compare an output of the toggle indicator capture element and the signal corresponding to the output of the capture element, the toggle indicator comparison element configured to output a toggle indicator signal when the output of the toggle indicator capture element and the signal corresponding to the output of the capture element do not satisfy an expected condition.

8. A monitoring system for monitoring delay of critical path timing margins for a circuit, comprising:
a plurality of adaptive monitoring circuits, each adaptive monitoring circuit coupled to a corresponding one of a plurality of paths in a circuit, each adaptive monitoring circuit comprising:
a delay element receiving a signal corresponding to an output of a first stage of computation of the corresponding one of the plurality of paths in the circuit
a set-up capture element capturing an output of the delay element at a rising edge of a same clock signal used to capture the output of the first stage of computation for an endpoint and
a set-up warning comparison element coupled to compare an output of the set-up capture element and a signal corresponding to an output of a capture element of the corresponding one of the plurality of paths in the circuit, the set-up warning comparison element configured to output a set-up warning signal when the output of the set-up capture element and the signal corresponding to the output of the capture element do not satisfy an expected condition; and
a plurality of set-up alarm circuits, each set-up alarm circuit coupled to a corresponding adaptive monitoring circuit of the plurality of adaptive monitoring circuits and coupled to the corresponding one of the plurality of paths in the circuit, each set-up alarm circuit comprising:
a set-up delay element coupled to the output of the first stage of computation of the corresponding one of the plurality of paths in the circuit;
a shadow capture element coupled to capture an output of the set-up delay element at the rising edge of the same clock signal used to capture the output of the first stage of computation for the endpoint; and
a comparison element coupled to compare the output of the capture element of the corresponding one of the plurality of paths in the circuit and an output of the shadow capture element, the comparison element configured to output a set-up alarm signal when the output of the capture element and the shadow capture element do not satisfy an expected condition, wherein the first delay element of the corresponding adaptive monitoring circuit is coupled to the inverting output of the inverter to receive the signal corresponding to the output of the first stage of computation of the corresponding one of the plurality of paths in the circuit, and
wherein the set-up warning comparison element is coupled to the output of the shadow capture element to receive the signal corresponding to the output of the capture element.

9. The monitoring system of claim 8, wherein:
the comparison element is coupled to the Qbar output of the shadow capture element and the Qbar output of the capture element of the corresponding one of the plurality of paths in the circuit; and
the set-up warning comparison element is coupled to the Qbar output of the set-up capture element and the Qbar output of the capture element of the corresponding one of the plurality of paths in the circuit.

10. A computer-implemented method for designing monitoring systems with adaptive control circuitry delivering control signals of adaptive system operation or detection of malfunction, the method comprising:
- selecting N critical paths of a circuit for monitoring, based on on-chip timing variation determined during circuit simulation;
- for each of the N critical paths:
  - determining a first delay value of a first delay element of a corresponding adaptive monitoring circuit by adding delay to the path until a mean timing of the N critical paths is within one minimum mean unit delay during simulation; and
  - determining second delay values for a second delay element of the corresponding adaptive monitoring circuit by adding delay to the path until a mean timing of N critical paths is $k*\sigma_{max}$, wherein k relates to a set-up margin used for timing closure during simulation and $\sigma_{max}$ is a worst delay variation amongst the N critical paths during the simulation;
- inserting a plurality of adaptive monitoring circuits into the circuit, the plurality of adaptive monitoring circuits comprising the corresponding adaptive monitoring circuit for each of the N critical paths, wherein each adaptive monitoring circuit comprises:
  - the first delay element having the first delay value;
  - the second delay element having the second delay values;
  - a set-up capture element; and
  - a set-up warning comparison element and
- inserting a plurality of toggle indicator circuits into the circuit, each toggle indicator circuit coupled to a corresponding adaptive monitoring circuit of the plurality of adaptive monitoring circuits and coupled to a corresponding one of the N critical paths in the circuit, each toggle indicator circuit comprising:
  - a toggle indicator capture element coupled to capture the signal corresponding to the output of the capture element at the rising edge of the same clock signal used to capture the output of the first stage of computation for the endpoint; and
  - a toggle indicator comparison element coupled to compare an output of the toggle indicator capture element and the signal corresponding to the output of the capture element.

11. The computer-implemented method of claim 10, wherein the second delay element comprises one or more delay buffers.

12. The computer-implemented method of claim 11, wherein each adaptive monitoring circuit further comprises a multiplexer coupled to select any of the one or more delay buffers and provide the output to the set-up capture element.

13. The computer-implemented method of claim 10, wherein the set-up warning comparison element comprises a XOR gate.

14. The computer-implemented method of claim 10, further comprising inserting a plurality of set-up alarm circuits, each set-up alarm circuit coupled to a corresponding adaptive monitoring circuit of the plurality of adaptive monitoring circuits and coupled to a corresponding one of the N critical paths in the circuit.

* * * * *